Oct. 11, 1938.  J. L. STABLEFORD  2,133,120
PROJECTION SCREEN
Filed Jan. 4, 1937
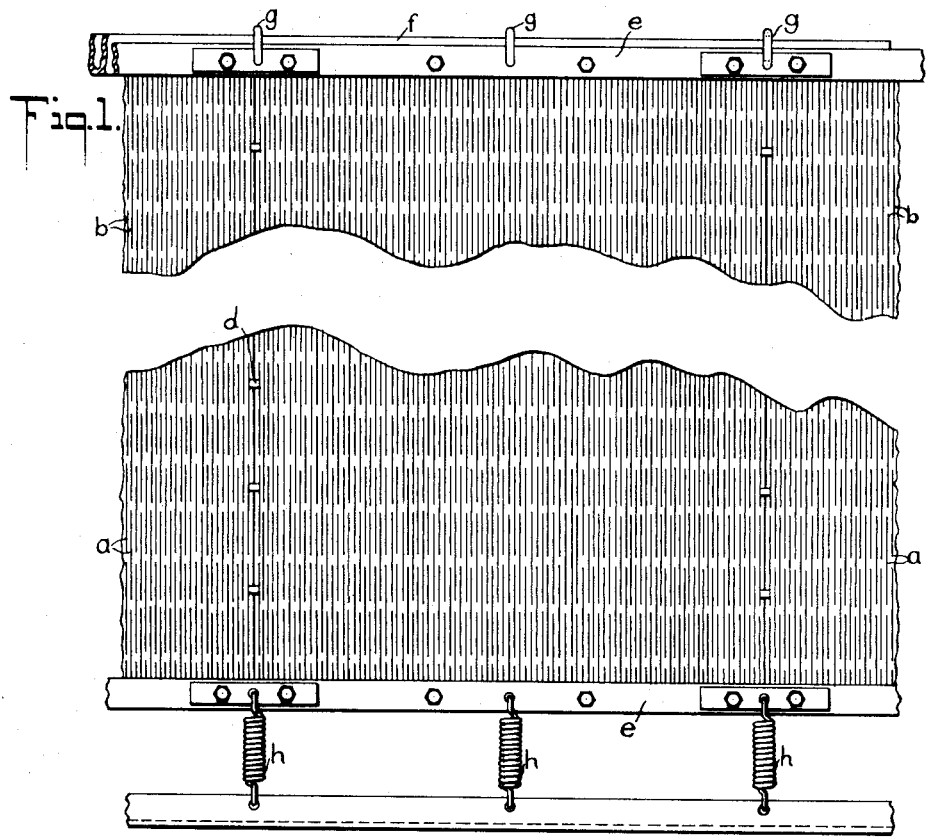
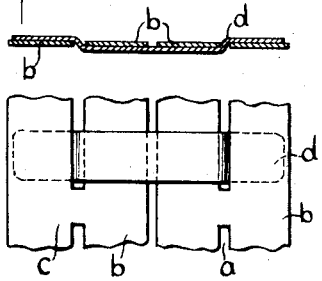
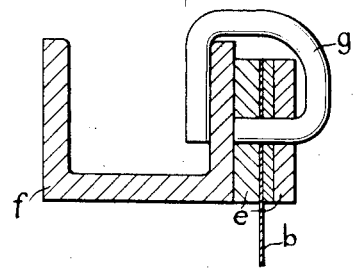
INVENTOR
John L. Stableford
BY
Henry J. Lucke
HIS ATTORNEY Patented Oct. 11, 1938

2,133,120

UNITED STATES PATENT OFFICE 2,133,120

PROJECTION SCREEN

John Leslie Stableford, London, England

Application January 4, 1937, Serial No. 118,990
In Great Britain January 9, 1936

7 Claims. (Cl. 88—24)

This invention relates to projection screens such as are used for cinematograph displays.

This invention more particularly concerns cinema projection screens which are to be used in conjunction with sound apparatus.

It is usual to place one or more loudspeakers or amplifiers immediately behind the screen so that the sound seems to emanate, from the audience's point of view, from the figures depicted upon the screen.

It is also usual to project the images on to the screen from the front of the latter. It is therefore desirable that the screen should have high light reflecting characteristics and at the same time be permeable to sound.

It has therefore previously been proposed to employ screens of metal which have been perforated in various ways so as to permit sound to pass through the screens, whilst interfering to a minimum degree with the reflecting properties of the screen.

It has, for example, been proposed to construct a cinematographic projection screen comprising a number of panels or units each consisting of a relatively thin sheet of metal provided with small circular perforations distributed over the surface of the sheet, the perforations being very small in relation to the size of the sheet and in relation to their spacing, and being such that from a normal distance from the eye the screen presents a substantially uniform surface.

It has also been proposed to construct a cinematograph projection screen of two layers of perforated metal sheet with a wire grid or other supporting structure disposed therebetween to prevent the impingement of one sheet against the other. In this screen, as in the other previously proposed screen referred to above, small perforations of a circular form were provided in each layer in the screen and the perforations in the one layer were offset with regard to the perforations in the other layer so that there could be no direct passage of light rays through the screen.

Moreover, it has been proposed previously to provide a cinematograph screen having a plurality of laterally spaced side by side bands of opaque material extending from the top to the bottom of the screen and disposed in front of a series of similarly spaced opaque bands at right angles thereto.

Another form of projection screen which has been proposed is one which comprises a series of sections arranged side by side and each of a similar form. It was proposed that each of these sections should be formed of two metal parts, each having side flanges disposed at an angle to the face of the screen and serving to connect its section to the next section of the screen. The face of each of the said parts of the screen was to be stamped out to provide vanes arranged in the well-known Venetian blind fashion, with the widths of the vanes disposed obliquely to the plane of the screen.

When the said two parts had been stamped out in this way they were placed together so as to interleaf the vanes in such a manner that the vanes of the one part were disposed between the vanes of the other part and the light reflecting surfaces overlapped slightly.

It will be appreciated that the difficulties encountered in providing a satisfactory metal cinematograph projection screen for use with projection apparatus and sound apparatus simultaneously are very great and it has been believed in the art that a really efficient metal screen was unattainable.

For example, it is difficult to produce a metal screen which does not resonate and resonance in a screen is highly undesirable. Moreover to make the screen sufficiently sound-permeable has hitherto presented a great problem if this is to be done without interfering with the light reflecting properties of the screen and the difficulty on this point is emphasized by the fact that various proposals have hitherto been made in which a double layer screen has been used so that the holes in the one layer were masked by offsetting the holes in the other layer.

The object of this invention is to provide an improved metal cinematograph projection screen suitable for simultaneous use with sound apparatus and projection apparatus and further objects of the invention are to provide a screen which is substantially non-resonating and at the same time has high light reflecting characteristics and is permeable to a high degree to the sound emanating from the sound apparatus which would, in the ordinary way, be arranged behind the screen.

A further object of the invention is so to slot the metal sheet from which the screen is made as to provide narrow continuous reflecting bars connected together by very short connecting strips integral with the bars and to render the screen substantially flexible or limp as distinct from taut in the manner of a drum skin, such as would ordinarily be the condition of a screen formed of panels provided with small well spaced perforations.

A further object of the invention is to provide a cinematograph sound-projection screen formed of light gauge sheet metal provided with side by side spaced rows of long and narrow elongated slots spaced end from end in the rows, which slots are of such dimensions as to render the screen or sheet substantially flexible or limp without interfering with the efficient light reflection of the screen as a whole.

The object of the present invention is to overcome the difficulties and disadvantages hitherto experienced with metal screens and to produce a screen which will be fireproof, durable and non-resonating while giving increased illumination and sound permeability, and being light in weight and easily assembled or mounted.

Further objects and features of the invention will become apparent from the subsequent description of one embodiment of the invention and from the claims.

The accompanying drawing illustrates one mode of carrying out the invention.

Figure 1 is a front elevation showing a portion of a screen constructed in accordance with the invention.

Figures 2 and 3 are enlarged views showing a detail, and

Figure 4 is also an enlarged view showing a further detail.

In carrying my invention into effect in one convenient manner I form my metal screen from sheet metal, preferably of a ductile character, such as aluminium or zinc, and of light gauge and this sheet I provide with a plurality of slots $a$ running the length of the sheet and so arranged as to leave a plurality of continuous bars $b$ of unbroken reflecting surface. The slots are very narrow in width and are spaced only a short distance apart from one another so that I thus produce a completely flexible mat-like structure which will be non-resonating and will therefore require no strutting or staying. In the particular construction shown the slots are rectilinear and parallel and are disposed vertically but it will be understood that the invention is not to be limited to these details as I may vary the shape and mode of disposition of the slots as may be found best suited to any requirements. Further, although I have obtained excellent results with slots of approximately 1/64th" in width and spaced apart from one another by approximately 1/4" here again it will be understood that the invention is not limited to any particular dimensions. The slots are interrupted over a small distance at irregular intervals so that adjacent bars $b$ are connected together at intervals by narrow connecting strips $c$ and the connecting strips of one pair of bars are staggered in relation to the connecting strips of adjacent pairs of bars so as not to interfere with the non-resonating character of the screen while giving stability and support to the bars $b$ of reflecting surface without seriously affecting the general flexibility.

The projection screen may be formed of a single sheet of material of the foregoing character but preferably it would be constructed from a number of sheets which are cleated together by clips $d$ adapted to engage slots which are in register (as clearly shown in Figure 3), the clips being very readily assembled and at the same time giving a closely fitting butt joint between adjacent screen strips.

The clips $d$, shown on an enlarged scale in Figures 2 and 3, are doubly cranked at a distance from each end so that there is a long central portion disposed in a plane parallel to, but spaced from, a further plane in which are disposed the two ends of the clips.

In introducing the clip into position to connect two adjacent sections of the screen, one end of the clip is threaded through an elongated slot in one of the said screen sections at a position about midway between the ends of the slot where the screen is somewhat flexible and the metal on the opposite sides of the slot can be easily separated for the introduction of the end of the clip. Then the opposite end of the clip is similarly introduced into the corresponding elongated slot in the adjacent screen section. Then the clip is slidden downwardly until the lower longitudinal edge of the clip lies adjacent the lower ends of the elongated slots in which the clip ends are engaged. It will be appreciated that just adjacent the lower end of the elongated slots the metal on either side of each of the slots cannot be separated so readily as the metal on either side of the elongated slots midway between the ends of the latter, and therefore the clips are firmly positioned and the screen sections are held together in quite a positive fashion.

The screen thus formed may be mounted in any suitable manner and in the example shown the top and bottom edges of the screen strips are held between stretcher bars $e$ bolted or otherwise secured together and these are suspended upon a frame $f$ of channel, tubular or other form by means of clip hooks $g$ or other suitable fastenings. It should be understood that the invention is not limited to any particular form of frame nor to any particular mode of construction of the same and such frame may either completely surround the screen, or the frame members may be disposed at the top and bottom only as may be found most convenient in any particular location. Moreover, when necessary or desirable either the top or bottom edge of the screen or both may be secured to an appropriate frame member by means of springs $h$ which will be arranged to place the screen under an even tension. The screen may of course be painted or sprayed to provide for maximum illumination and, in addition to the advantages hereinbefore mentioned, my improved screen has an additional advantage that the slots, due to their formation, are not likely to be clogged with paint so that they will maintain their usefulness. Moreover any scratches in the film being shown will be to a very large extent suppressed or cancelled out in projection due to the fact that they will to a large extent coincide with the vertical slots in the screen and will thus be rendered invisible. The method of slotting herein described may be applied with advantage to the ordinary types of fabric screens.

What I claim is:—

1. A sound screen structure comprising a plurality of vertically extending thin sheet metal sheets joined at their edges to form a continuous screen surface, means for supporting the plurality of sheet metal sheets at the top and bottom edges, a plurality of spaced vertically extending rows of long, narrow slots being provided in said sheet metal sheets, the length of said slots being long relative to the width thereof and running in a direction parallel to the length of said sheets, said slots defining between them closely spaced bars each connected to the next bar by spaced connecting strips extending transversely of said bars, the strips integrally connecting the ends of successive pairs of bars staggered in relation to the connecting strips of adjacent bars to form a series of parallel rows across the screen whereby the bars running continuously from the bottom to the top of the metal sheet are joined to an adjacent bar by strips at uniform distance apart alternately on the two sides thereof to form a non-resonating screen network, and a reflecting surface on said network.

2. A sound screen structure comprising a uniplanar vertically extending thin sheet metal sheet, a plurality of spaced parallel rows of slots in said sheet metal sheet, the length of said slots being long relative to the width thereof and running in a direction perpendicular to the supported edges of the sheet, means supporting the sheet at the ends of the sheet adjacent to the ends of the slots, said slots defining between them closely spaced bars each connected to the next bar by spaced connecting strips extending transversely of said bars, the strips integrally connecting successive pairs of bars being staggered in relation to the connecting strips of adjacent bars to form a series of parallel rows across the screen whereby the bars running continuously from supported edge to supported edge of the metal sheet are each joined to an adjacent bar solely by strips spaced apart alternately on the two sides thereof to form a flexible non-resonating reflecting screen.

3. A sound screen structure comprising a uniplanar upright sheet of thin metal sheet, means for supporting this sheet at its upper and lower edges, means for tensioning the sheet in a vertical direction, a plurality of spaced parallel rows of slots in said sheet, the length of the slots being great relative to the width thereof and extending parallel to the vertical edges of the sheet, said slots forming between them closely spaced continuous bars each joined to the next bar by a plurality of spaced transverse connecting strips, and the connecting strips integrally joining any one of said bars to a second bar being staggered in relation to those joining the said bar to a third bar.

4. A sound screen structure comprising a plurality of vertically extending thin sheet metal sheets disposed side by side with the vertical edges of adjacent sheets connected together, means for supporting said sheets and for tensioning them in a vertical direction, said sheets each having a plurality of uniformly spaced vertically extending rows of end to end spaced slots, the vertical length of each of which is great relative to the width thereof, said slots all being of the same length and defining between them closely spaced vertical bars each connected integrally to the next bar by connecting strips extending transversely of said bars, and the said slots of adjacent rows being vertically staggered with respect to one another.

5. A flexible sound screen structure comprising a plurality of one-piece flat thin sheet metal strips placed vertically side by side and having adjacent vertical edges joined together, means for supporting said strips at the upper and lower ends, means for tensioning the strips longitudinally, a series of uniformly spaced parallel rows of long narrow slots spaced end from end, formed in each of said strips with the lengths of said slots extending vertically of the strips, said slots passing through the sheet perpendicular to the plane thereof each having all its edges in the same plane, and the slots forming between them closely spaced continuous bars each extending vertically from the bottom to the top of the screen and forming also uniformly spaced connecting strips extending transversely between said reflecting bars and connecting them together, each bar being integrally connected by connecting strips alternately to the bars to the right and left of it.

6. A sound screen structure comprising a uniplanar thin sheet metal sheet, means arranged at and secured to opposite ends of the sheet and for placing the material of the sheet under tension in the direction of its length to thereby maintain the uniplanar character of the sheet, a plurality of aligned rows of elongated slots formed in each sheet substantially perpendicular to the supported edges of the sheet, said slots being long relative to the width thereof and said slots defining between them closely spaced bars of the metal of the sheet, each bar connected to the next bar by spaced connecting strips extending transversely of said bars, the strips integrally connecting successive pairs of bars being staggered in relation to the connecting strips of adjacent bars, to thereby form a series of parallel rows of strips across the screen and parallel to the supported edges, whereby the bars running continuously from supported edge to supported edge of the sheet are each joined to an adjacent bar solely by strips spaced apart alternately on the two sides thereof to form a flexible non-resonating screen.

7. A sound screen structure comprising a plurality of parallelly arranged thin metal sheets lying in substantially the same plane to form a continuous screen surface, means arranged at and secured to opposite ends of the plurality of sheets for placing the material of the sheets under tension to thereby maintain the plurality of sheets in substantially a single plane, each sheet having a plurality of aligned rows of elongated slots formed therein and substantially perpendicular to the supported edges thereof, said slots being long relative to the width of the sheet and said slots defining between them closely spaced bars of the metal of the sheet, each bar connected to the next bar by spaced connecting strips extending transversely of the bars, the strips integrally connecting successive pairs of bars being staggered to connecting strips of adjacent bars, to thereby form a series of parallel rows across the screen and parallel to the supporting edges thereof, whereby the bars running continuously from supported edge to supported edge of the sheet are each joined to an adjacent bar solely by strips spaced apart alternately on the two sides thereof forming a flexible non-resonating screen, and means for joining adjacent sheets together and lying substantially in the plane of the sheets.

JOHN LESLIE STABLEFORD.